US010496885B2

United States Patent
Hussein et al.

(10) Patent No.: US 10,496,885 B2
(45) Date of Patent: Dec. 3, 2019

(54) UNIFIED EMBEDDING WITH METRIC LEARNING FOR ZERO-EXEMPLAR EVENT DETECTION

(71) Applicant: QUALCOMM Incorporated, San Diego, CA (US)

(72) Inventors: Noureldien Mahmoud Elsayed Hussein, Amsterdam (NL); Efstratios Gavves, Amsterdam (NL); Arnold Wilhelmus Maria Smeulders, Amsterdam (NL)

(73) Assignee: Qualcomm Incorporated, San Diego, CA (US)

( * ) Notice: Subject to any disclaimer, the term of this patent is extended or adjusted under 35 U.S.C. 154(b) by 69 days.

(21) Appl. No.: 15/629,663

(22) Filed: Jun. 21, 2017

(65) Prior Publication Data

US 2018/0137360 A1    May 17, 2018

Related U.S. Application Data

(60) Provisional application No. 62/420,914, filed on Nov. 11, 2016.

(51) Int. Cl.
G06K 9/00     (2006.01)
G06N 3/08     (2006.01)
(Continued)

(52) U.S. Cl.
CPC ..... *G06K 9/00718* (2013.01); *G06F 16/3331* (2019.01); *G06K 9/00751* (2013.01);
(Continued)

(58) Field of Classification Search
None
See application file for complete search history.

(56) References Cited

U.S. PATENT DOCUMENTS

| 9,183,466 | B2 | 11/2015 | Siskind et al. | |
| 2016/0357748 | A1* | 12/2016 | Hsiao | G06F 16/5838 |
| 2017/0150235 | A1* | 5/2017 | Mei | H04N 21/8405 |

FOREIGN PATENT DOCUMENTS

EP    3096243 A1    11/2016

OTHER PUBLICATIONS

Shiyu Chang, "Heterogeneous Network Embedding via Deep Architectures", KDD 2015.*

(Continued)

*Primary Examiner* — Mark Roz
(74) *Attorney, Agent, or Firm* — Arent Fox, LLP

(57) ABSTRACT

A method, a computer-readable medium, and an apparatus for zero-exemplar event detection are provided. The apparatus may receive a plurality of text blocks, each of which may describe one of a plurality of pre-defined events. The apparatus may receive a plurality of training videos, each of which may be associated with one of the plurality of text blocks. The apparatus may propagate each text block through a neural network to obtain a textual representation in a joint space of textual and video representations. The apparatus may propagate each training video through the neural network to obtain a visual representation in the joint space. The apparatus may adjust parameters of the neural network to reduce, for each pair of associated text block and training video, the distance in the joint space between the textual representation of the associated text block and the visual representation of the associated training video.

14 Claims, 9 Drawing Sheets

(51) Int. Cl.
   *G06F 16/33*   (2019.01)
   *G06K 9/62*    (2006.01)
   *G06N 3/04*    (2006.01)

(52) U.S. Cl.
   CPC .......... *G06K 9/627* (2013.01); *G06N 3/0454* (2013.01); *G06N 3/08* (2013.01); *G06K 2009/00738* (2013.01)

(56) References Cited

OTHER PUBLICATIONS

Shiyu Chang, "Heterogeneous Network Embedding via Deep Architectures" ACM 2015 (Year: 2015).*
Cappallo S., et al., "Video Stream Retrieval of Unseen Queries using Semantic Memory", 2016, pp. 1-12.
Liu W., et al., "Multi-Task Deep Visual-Semantic Embedding for Video Thumbnail Selection", IEEE Conference on Computer Vision and Pattern Recognition (CVPR), 2015 pp. 3707-3715.
Xu R., et al., "Jointly Modeling Deep Video and Compositional Text to Bridge Vision and Language in a Unified Framework", AAAI 2015 Proceedings of the Twenty-Ninth AAAI Conference on Artificial Intelligence, Jan. 2015, pp. 2346-2352.

* cited by examiner

UNIFIED EMBEDDING WITH METRIC LEARNING FOR ZERO-EXEMPLAR EVENT DETECTION

CROSS-REFERENCE TO RELATED APPLICATION(S)

This application claims the benefit of U.S. Provisional Application Ser. No. 62/420,914, entitled "UNIFIED EMBEDDING WITH METRIC LEARNING FOR ZERO-EXEMPLAR EVENT DETECTION" and filed on Nov. 11, 2016, which is expressly incorporated by reference herein in its entirety.

BACKGROUND

Field

The present disclosure relates generally to artificial neural networks, and more particularly, to zero-exemplar event detection.

Background

An artificial neural network, which may include an interconnected group of artificial neurons, may be a computational device or may represent a method to be performed by a computational device. Artificial neural networks may have corresponding structure and/or function in biological neural networks. However, artificial neural networks may provide innovative and useful computational techniques for certain applications in which traditional computational techniques may be cumbersome, impractical, or inadequate. Because artificial neural networks may infer a function from observations, such networks may be particularly useful in applications where the complexity of the task or data makes the design of the function by conventional techniques burdensome.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

An event may be defined as a complex activity occurring at a specific place and time involving people interacting with other people and/or objects. An event may include a number of human actions, processes, and activities that are loosely or tightly organized and that have temporal and semantic relationships to the overarching activity.

Recognizing an event in unconstrained consumer videos such as internet videos remains an open challenge in computer vision. This open challenge may come in different flavors according to the number of exemplars given to help in detection. In zero-exemplar event detection, no exemplar is given a priori.

In zero-exemplar event detection, the user may define a query that describes a novel event or activity, and one or more videos relevant to the novel event may be retrieved in response to the query. In forming the query (and consequently the event), the user is not expected to select a query from a predetermined set of queries. Instead, the user is free to enter any textual description. Therefore, the query is referred to as a novel query. It may be desirable to rank the videos in the database, such that videos semantically most similar to the query description of the event are ranked the highest. As the text query is novel (e.g., not selected from a predetermined set of queries), there may not be any direct annotations for the videos with respect to that query. Therefore, it may be difficult to retrieve videos that are most relevant to the text query.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for zero-exemplar event detection are provided. During time of training, the apparatus may receive a plurality of text blocks, each of which may describe one of a plurality of pre-defined events. The apparatus may receive a plurality of training videos, each of which may be associated with one of the plurality of text blocks. The apparatus may propagate each of the plurality of text blocks through the neural network to obtain a textual representation of the text block in a joint space of textual and video representations. The apparatus may propagate each of the plurality of training videos through the neural network to obtain a visual representation of the training video in the joint space. The apparatus may adjust parameters of the neural network to reduce, for each pair of associated text block and training video, the distance in the joint space between the textual representation of the associated text block and the visual representation of the associated training video.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
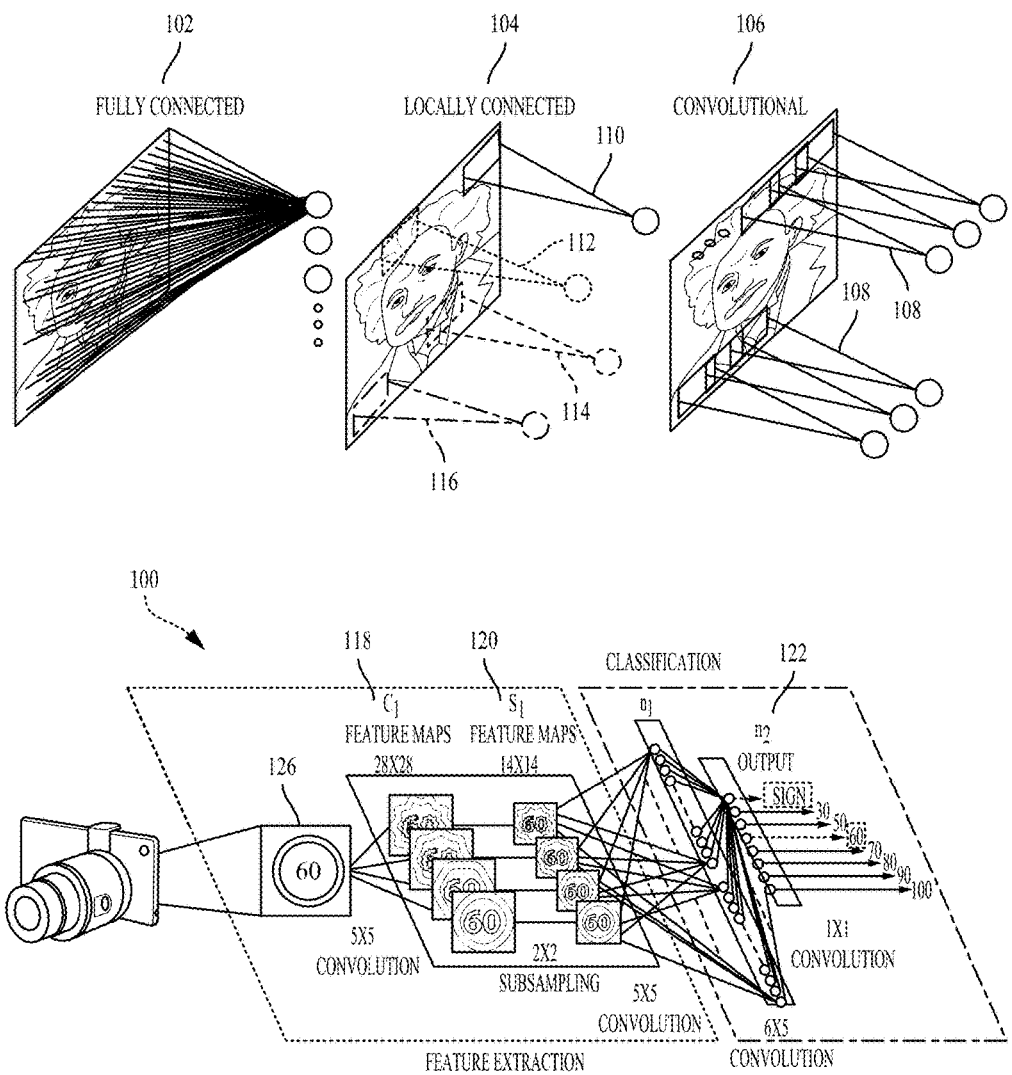
FIG. 1 is a diagram illustrating a neural network in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computing systems for artificial neural networks will now be presented with reference to various apparatus and methods. The apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

An artificial neural network may be defined by three types of parameters: 1) the interconnection pattern between the different layers of neurons; 2) the learning process for updating the weights of the interconnections; and 3) the activation function that converts a neuron's weighted input to the neuron's output activation. Neural networks may be designed with a variety of connectivity patterns. In feed-forward networks, information is passed from lower layers to higher layers, with each neuron in a given layer communicating with neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

FIG. 1 is a diagram illustrating a neural network in accordance with aspects of the present disclosure. As shown in FIG. 1, the connections between layers of a neural network may be fully connected 102 or locally connected 104. In a fully connected network 102, a neuron in a first layer may communicate the neuron's output to every neuron in a second layer, so that each neuron in the second layer receives an input from every neuron in the first layer. Alternatively, in a locally connected network 104, a neuron in a first layer may be connected to a limited number of neurons in the second layer. A convolutional network 106 may be locally connected, and may be further configured such that the connection strengths associated with the inputs for each neuron in the second layer are shared (e.g., connection strength 108). More generally, a locally connected layer of a network may be configured so that each neuron in a layer will have the same or a similar connectivity pattern, but with connections strengths that may have different values (e.g., 110, 112, 114, and 116). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a neural network 100 designed to recognize visual features from a car-mounted camera may develop high layer neurons with different properties depending on their association with the lower portion of the image versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image 126, such as a cropped image of a speed limit sign, and a "forward pass" may then be computed to produce an output 122. The output 122 may be a vector of values corresponding to features of the image 126 such as "sign," "60," and "100." The network designer may want the DCN to output a high score for some of the neurons in the output feature vector, for example the ones corresponding to "sign" and "60" as shown in the output 122 for a neural network 100 that has been trained to recognize traffic signs. Before training, the output produced by the DCN is likely to be incorrect, and so an error may be calculated between the actual output of the DCN and the target output desired from the DCN. The weights of the DCN may then be adjusted so that the output scores of the DCN are more closely aligned with the target output.

To adjust the weights, a learning algorithm may compute a gradient vector for the weights. The gradient may indicate an amount that an error would increase or decrease if the weight were adjusted slightly. At the top layer, the gradient may correspond directly to the value of a weight associated with an interconnection connecting an activated neuron in the penultimate layer and a neuron in the output layer. In lower layers, the gradient may depend on the value of the weights and on the computed error gradients of the higher layers. The weights may then be adjusted so as to reduce the error. Such a manner of adjusting the weights may be referred to as "back propagation" as the manner of adjusting weights involves a "backward pass" through the neural network.

In practice, the error gradient for the weights may be calculated over a small number of examples, so that the calculated gradient approximates the true error gradient. Such an approximation method may be referred to as a stochastic gradient descent. The stochastic gradient descent may be repeated until the error rate of the entire system converges (e.g., has stopped decreasing) or until the error rate reaches a target level.

After learning, the DCN may be presented with new images 126 and a forward pass through the network may yield an output 122 that may be considered an inference or a prediction of the DCN.

Deep convolutional networks (DCNs) are networks of convolutional networks, configured with additional pooling and normalization layers. DCNs may achieve state-of-the-art performance on many tasks. DCNs may be trained using supervised learning in which both the input and output targets are known for many exemplars The known input targets and output targets may be used to modify the weights of the network by use of gradient descent methods.

DCNs may be feed-forward networks. In addition, as described above, the connections from a neuron in a first layer of a DCN to a group of neurons in the next higher layer of the DCN are shared across the neurons in the first layer. The feed-forward and shared connections of DCNs may be exploited for faster processing. The computational burden of a DCN may be much less, for example, than that of a similarly sized neural network that includes recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered a three-dimensional network, with two spatial dimensions along the axes of the image and a third dimension capturing color information. The outputs of the convolutional connections may be considered to form a feature map in the subsequent layers 118 and 120, with each element of the feature map (e.g., 120) receiving input from a range of neurons in the previous layer (e.g., 118) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 2:
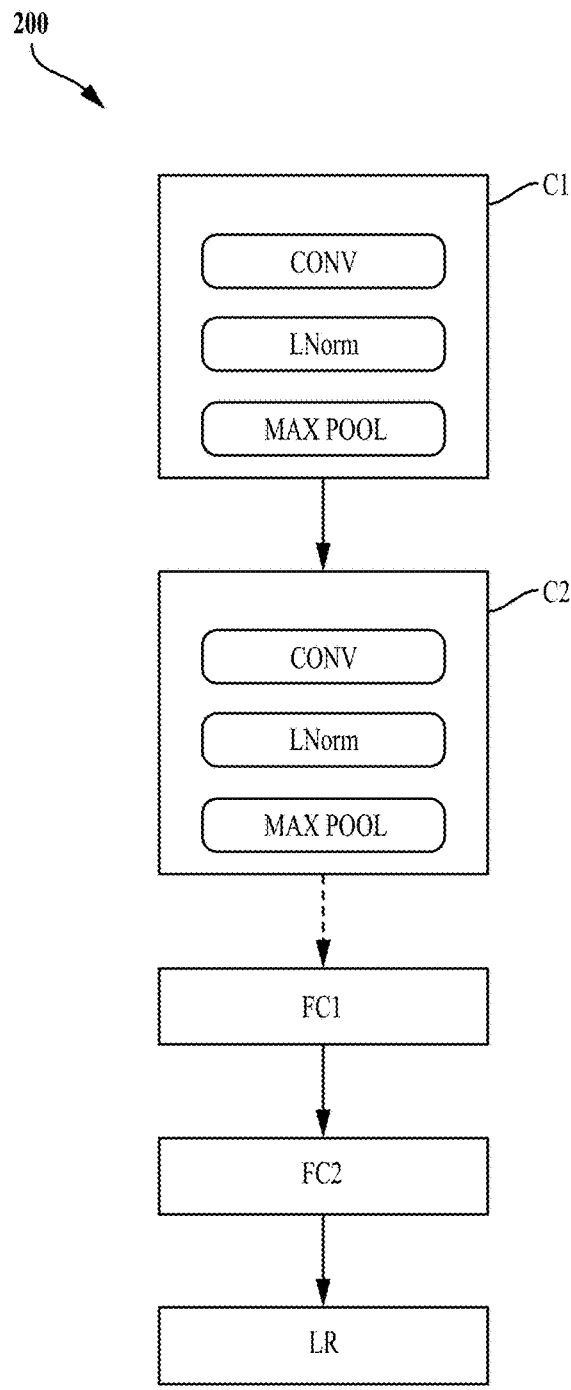
FIG. 2 is a block diagram illustrating an exemplary deep convolutional network (DCN) in accordance with aspects of the present disclosure.

FIG. 2 is a block diagram illustrating an exemplary deep convolutional network 200. The deep convolutional network 200 may include multiple different types of layers based on connectivity and weight sharing. As shown in FIG. 2, the exemplary deep convolutional network 200 includes multiple convolution blocks (e.g., C1 and C2). Each of the convolution blocks may be configured with a convolution layer (CONV), a normalization layer (LNorm), and a pooling layer (MAX POOL). The convolution layers may include one or more convolutional filters, which may be applied to the input data to generate a feature map. Although two convolution blocks are shown, the present disclosure is not so limited, and instead, any number of convolutional blocks may be included in the deep convolutional network 200 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU or GPU of a system on a chip (SOC), optionally based on an Advanced RISC Machine (ARM) instruction set, to achieve high performance and low power consumption. In alternative embodiments, the parallel filter banks may be loaded on the DSP or an image signal processor (ISP) of an SOC. In addition, the DCN may access other processing blocks that may be present on the SOC, such as processing blocks dedicated to sensors and navigation.

The deep convolutional network 200 may also include one or more fully connected layers (e.g., FC1 and FC2). The deep convolutional network 200 may further include a logistic regression (LR) layer. Between each layer of the deep convolutional network 200 are weights (not shown) that may be updated. The output of each layer may serve as an input of a succeeding layer in the deep convolutional network 200 to learn hierarchical feature representations from input data (e.g., images, audio, video, sensor data and/or other input data) supplied at the first convolution block C1.

The neural network 100 or the deep convolutional network 200 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software component executed by a processor, or any combination thereof. The neural network 100 or the deep convolutional network 200 may be utilized in a large range of applications, such as image and pattern recognition, machine learning, motor control, and the like. Each neuron in the neural network 100 or the deep convolutional network 200 may be implemented as a neuron circuit.

In certain aspects, the neural network 100 or the deep convolutional network 200 may be configured to perform zero-exemplar event detection, as will be described below with reference to FIGS. 2-9.

The problem in-hand for event detection is cross-modal in that the event has both a visual modality from the videos and a textual modality from the text queries provided by the user. Machine learning (e.g., neural network) may be used to learn the representation gap between the visual modality and the textual modality of an event. In one configuration, a cross-modal embedding that projects both the visual representations and textual representations on a joint embedding space may be provided for zero-exemplar event detection.

Figure 3:
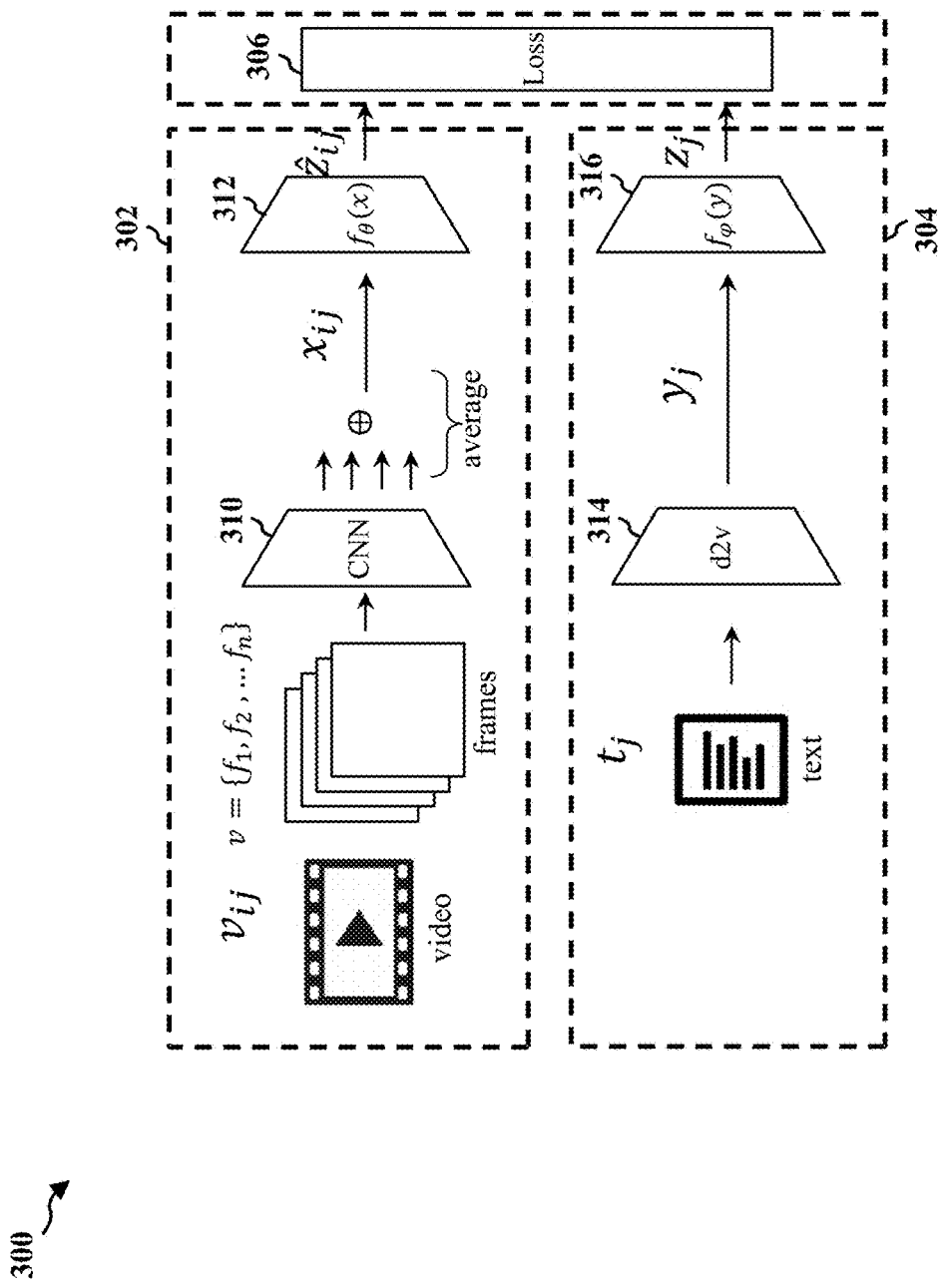
FIG. 3 is a diagram illustrating an example of a neural network for zero-exemplar event detection.

FIG. 3 is a diagram illustrating an example of a neural network 300 for zero-exemplar event detection. In the example, the neural network 300 may include a visual embedding block 302, a textual embedding block 304, and a loss function 306.

In the visual embedding block 302, the neural network 300 may receive a set of videos. Each video may have multiple frames. Through a subnetwork 310 (e.g., a convolutional neural network (CNN)), a visual representation may be extracted from each frame of a video. The visual representations for all frames of the video may be summed up to obtain a visual representation of the video $x_{ij}$. The visual representation of the video $x_{ij}$ may be embedded or projected, through a subnetwork 312, into a joint space of visual representations and textual representations.

In the textual embedding block 304, the textual information related to an event (e.g., the articles related to the event, titles and metadata of videos related to the event) or a text query may be processed using a pre-processing tool. The pre-processing tool may remove articles (e.g., "a", "an", "the") and prepositions (e.g., "of", "to", "for") from the textual information. In one configuration, the pre-processing may not involve Semantic Query Generation (SQG). After pre-processing, a textual representation $y_j$ may be extracted, though a subnetwork 314, from the pre-processed text. In one configuration, the textual representation $y_j$ may be a Least Semantic Indexing (LSI) feature representation of the pre-processed text. The LSI may have 2000 hidden topics. The subnetwork 314 may be learned a priori. The textual representation of the text $y_j$ may be embedded or projected, through a subnetwork 316, into the joint space of visual representations and textual representations. In one configuration, each point in the joint space may be represented by a vector or matrix.

The neural network 300 may learn to perform zero-exemplar event detection through the loss function 306. The loss function 306 may have two constraints: 1) projecting text (e.g., text description or query) and video related to the same event close to each other in the joint space; and 2) distancing different events in the joint space (e.g., through distancing representations associated with different events in the joint space).

In one configuration, the visual modality may be projected into the joint embedding space and the textual modality may also be projected to the joint embedding space. In the joint embedding space, the visual representations and textual representations may be similar (e.g., with small distance) for relevant videos (e.g., videos related to the same event) and dissimilar (large distance) for dissimilar videos (e.g., video related to different events). In other words, a semantic space (e.g., the joint embedding space) may be learned so that the projection of related videos and their texts/queries are located closer together in such space and that of the dissimilar videos and queries are located farther apart.

Figure 4:
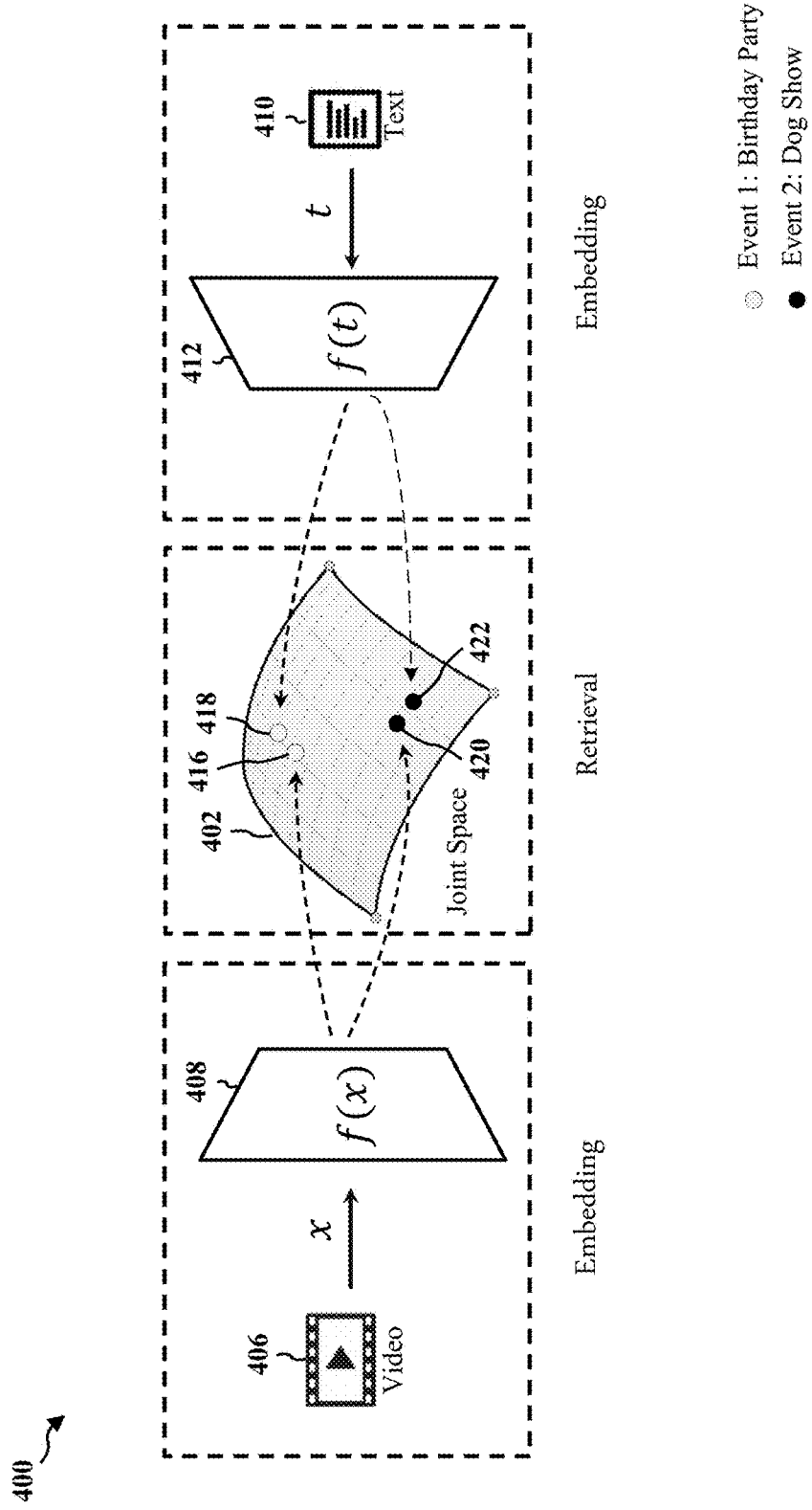
FIG. 4 is a diagram illustrating an example of embedding visual and textual modalities into a joint space.

FIG. 4 is a diagram 400 illustrating an example of embedding visual modality and textual modality into a joint space 402. As shown in the example, a video 406 may be embedded or projected, through a subnetwork 408 of a neural network, into the joint space 402. For example, a video related to a birthday party may be projected to a visual representation 416 in the joint space 402, and a video related to a dog show may be projected to a visual representation 420 in the joint space 402.

A text 410 (e.g., a textual description of an event, the title of a video, the metadata of a video, or a text query) may be embedded or projected, through a subnetwork 412 of the neural network, into the joint space 402. For example, a text related to the birthday party may be projected to a textual representation 418 in the joint space 402, and a text related to the dog show may be projected to a textual representation 422 in the joint space 402.

As shown in FIG. 4, the visual representation 416 of the birthday party and the textual representation 418 of the birthday party may be placed close to each other in the joint space 402 as they are associated with the same event, and the visual representation 420 of the dog show and the textual representation 422 of the dog show may be placed close to each other in the joint space 402 as they are associated with the same event. Furthermore, the representations 416 and 418 of the birthday party may be placed away from the representations 420 and 422 of the dog show in the joint space 402 as they are associated with different events.

Although the events the user will query may not be known in advance in zero-exemplar event detection, events in general may be expressed as a combination of other events, for which prior knowledge may exist. For instance, even if what type of event "participating in a rodeo match" is unknown (e.g., there are no videos annotated for that particular event), the event may be cast as a combination of other events for which there are annotations, such as "horseback riding", "participating in a horse race", etc. The existing events may be considered as an external repository of knowledge, or knowledge database, that may be used to reason about novel events. In one configuration, the EventNet-WikiHow datasets may be used to learn the visual and textual associations between existing and novel events. The EventNet contains 500 events. Each event in the EventNet is associated with a WikiHow webpage article, where the procedure, the semantics and the content of the event are described. Each event in the EventNet is also associated with one or more videos.

Figure 5:
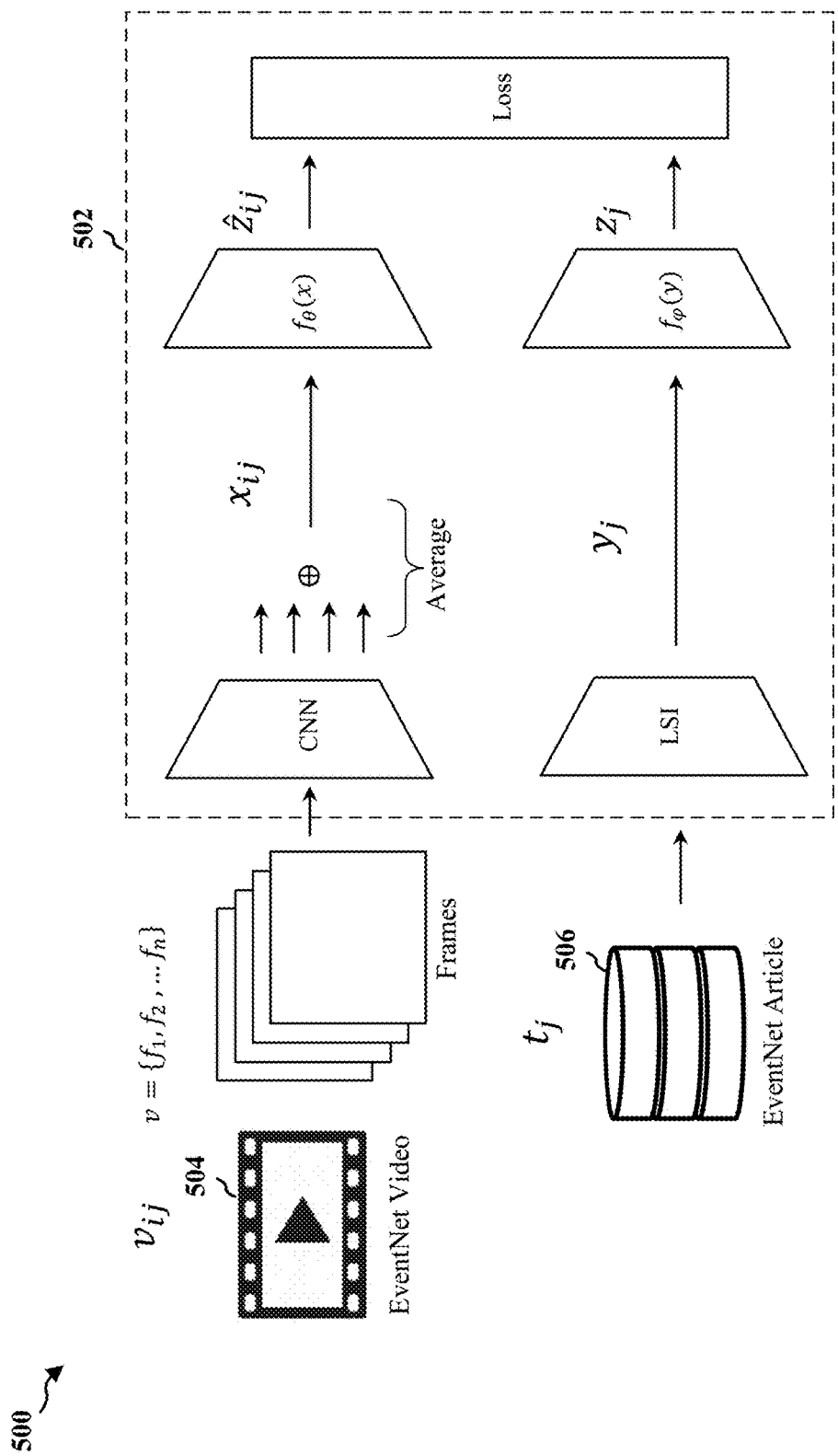
FIG. 5 is a diagram illustrating an example of training a neural network for zero-exemplar event detection.

FIG. 5 is a diagram 500 illustrating an example of training a neural network 502 for zero-exemplar event detection. In one configuration, the neural network 502 may be the neural network 300 described above with reference to FIG. 3. In the example, the EventNet videos 504 may be fed into the neural network 502 to extract a visual representation for each video in a joint space of visual representations and textual representations. The EventNet articles 506 may be fed into the neural network 502 to extract a textual representation for each article in the joint space. The neural network 502 may be trained to minimize the distance between any two representations (e.g., two textual representations, two visual representations, or one textual representation and one visual representation) that are associated with the same event and distance any two representations (e.g., two textual representations, two visual representations, or one textual representation and one visual representation) that are associated with two different events.

Figure 6:
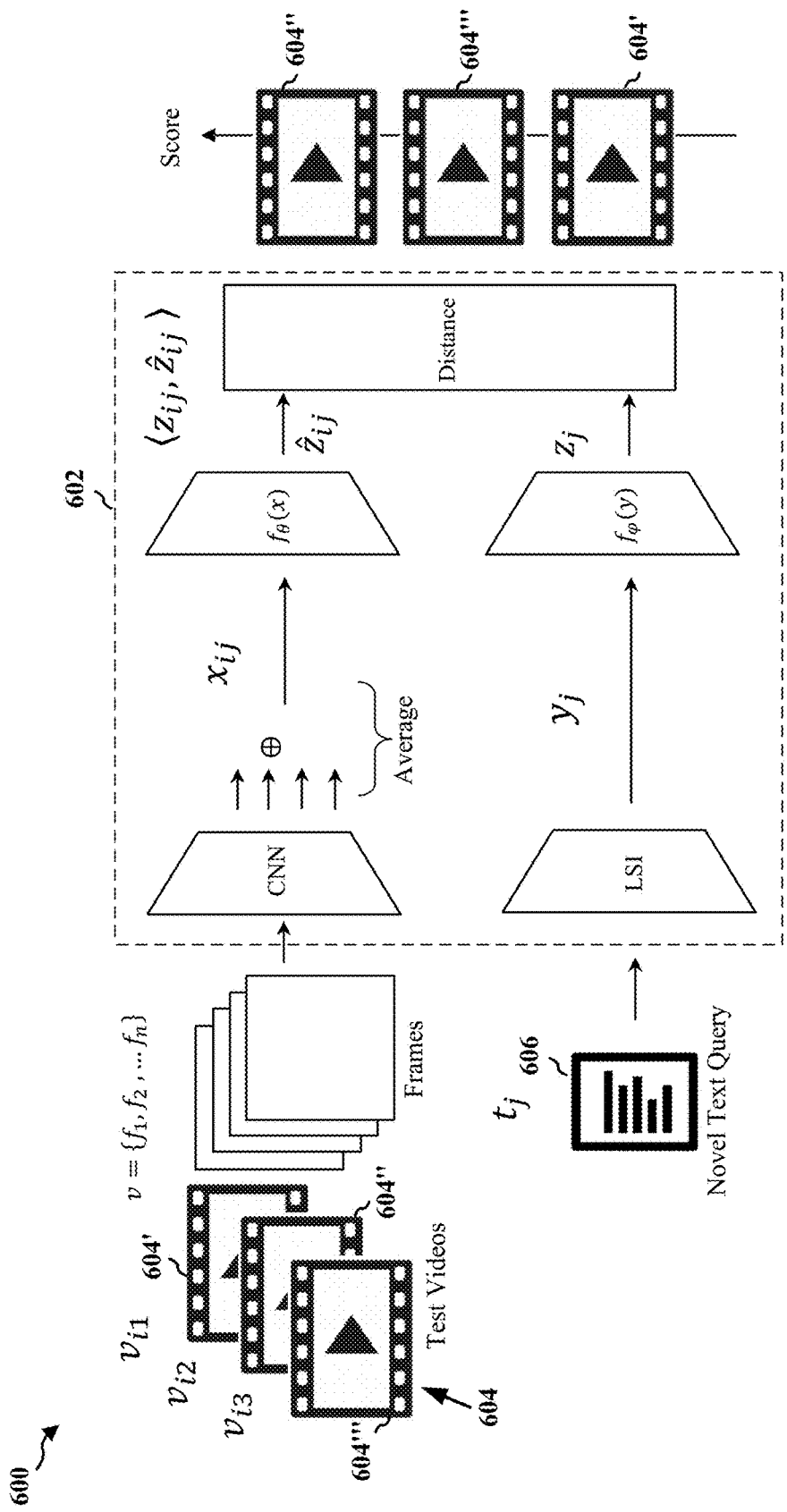
FIG. 6 is a diagram illustrating an example of using a trained neural network for zero-exemplar event detection.
Figure 7:
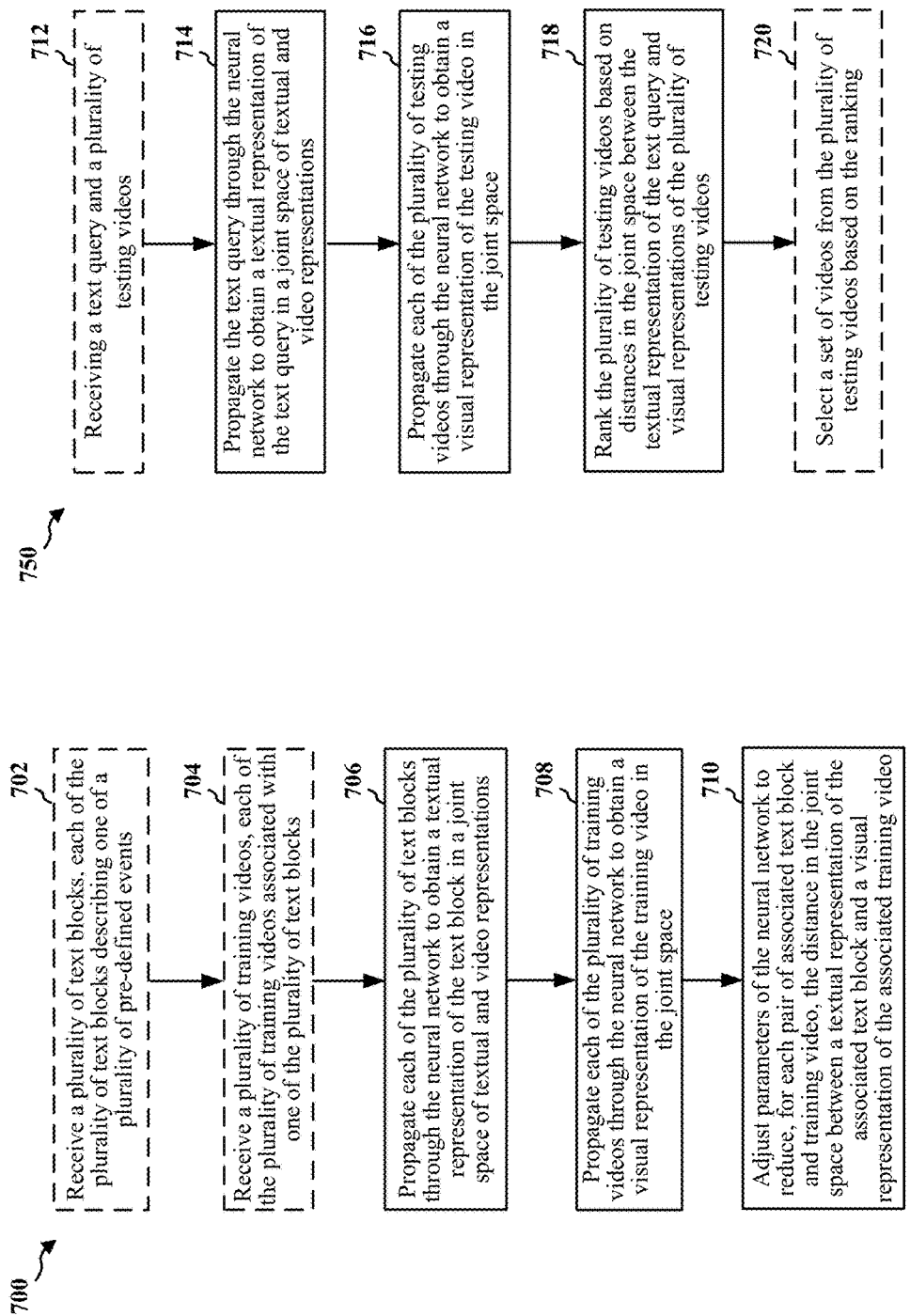
FIG. 7A is a flowchart of a method of training a neural network for zero-exemplar event detection.
FIG. 7B is a flowchart of a method of using a trained neural network for zero-exemplar event detection.

FIG. 6 is a diagram 600 illustrating an example of using a trained neural network 602 for zero-exemplar event detection. In one configuration, the neural network 602 may be the neural network 300 described above with reference to FIG. 3. In one configuration, the neural network 602 may be the trained neural network 502 described above with reference to FIG. 5. In the example, several test videos 604 (shown to include 604', 604", 604''') may be fed into the neural network 602 to extract a visual representation for each video in a joint space of visual and textual representations. A novel text query 606 may be fed into the neural network 602 to extract a textual representation for the text query 606 in the joint space. Each of the videos 604 may be assigned a score based on the distance between the video's respective visual representation and the textual representation of the text query 606 in the joint space. The videos 604 may be ranked (shown with a ranking order 604", 604''', 604', in one example) based on each video's assigned score. A subset of the videos 604 with the highest scores (e.g., the videos whose visual representations have the closest distances to the textual representation of the text query 606) may be retrieved as the result of the text query 606.

In one configuration, an end-to-end neural-network-based model for zero-exemplar event detection is provided. In one configuration, an external knowledge database (e.g., EventNet) may be used to train the neural network. The external knowledge database may contain examples of generic videos (e.g., 85,000 videos for 500 events). In addition, the external knowledge database may contain long, article-based textual descriptions of the same events (e.g., WikiHow articles for the 500 events).

In one configuration, a textual projection may be learned from long, article-based descriptions of events instead of relying on sentence-based representations (such as Word2Vec or binary-term vectors). An advantage of such an approach may be that novel events may be cast as a combination of existing events, allowing the reuse of knowledge bits shared between different events. For instance, a "wedding party" event and a "school graduation" event both contain "dancing". This may be reused for a novel event query of the type "dancing in a club with my friends", which also involves dancing. In one configuration, topic models may be learned on Wikipedia dump. Least Semantic Indexing (LSI) with 2000 hidden topic, denoted as $g_\omega$, may be used for the feature representation ($y_t$) of the textual modality (t) and the mapping from the textual modality to LSI may be learned a priori. Another embedding ($f_\varphi$) may be learned to project the LSI textual representation ($y_t$) into the common embedding space (e.g., the joint space 402), resulting a feature representation ($z_t$). Mathematically speaking:

LSI feature representation $y_t = g_\omega(t)$ (1)

Learned textual embedding $z_t = f_\varphi(y_t)$ (2)

In one configuration, discriminative distance metric learning may be performed. In one configuration, sample positive pairs and negative pairs may be used to train the neural network. A positive pair may include a text and a video that are associated with the same event. In a negative pair, the text does not relate to the video (e.g., the text and the video associated with different events). The network may compute projections ($f_\theta$, $f_\varphi$) such that the distances generated from the positive pairs are smaller than the distances generated from the negative pairs. An advantage of such an approach may be that the neural network learns the distance metric in a relativistic, pairwise fashion (positive vs. negative pairs). Such an approach may work better when the network is trained to perform ranking, as in event detection, since the ranking is determined by comparing pairwise distances. In one configuration, the contrastive loss ($l_c$) may be the objective function of the neural network. Mathematically speaking:

CNN visual representation $$x_v = f_\theta(v) \quad (3)$$

Learned visual embedding $$\hat{z}_t = f_\theta(x_v) \quad (4)$$

Learned textual embedding $$z_t = f_\varphi(y_t) \quad (5)$$

Contrastive Loss $$l_c = \frac{1}{2N} \sum (q)d^2 + (1-q)\max(1-d, 0)^2 \quad (6)$$

where $d = \|\hat{z}_t - z_t\|^2$

In one configuration, an end-to-end neural-network-based system that learns both visual and textual projections simultaneously is provided. The system may eliminate the use of external components, such as the Semantic Query Generation (SCG). Furthermore, the system may allow for more accurate projections into the common embedding space.

FIG. 7A is a flowchart 700 of a method of training a neural network for zero-exemplar event detection. The method may be performed by a computing device (e.g., the apparatus 802/802'). At 702, the device may optionally receive a plurality of text blocks, each of which may describe one of a plurality of pre-defined events. A text block may be an article, and/or the title of a video, and/or metadata of a video.

At 704, the device may optionally receive a plurality of training videos, each of which may be associated with one of the plurality of text blocks. In one configuration, the plurality of text blocks and the plurality of training videos may be publically available.

At 706, the device may propagate each of the plurality of text blocks through the neural network to obtain a textual representation of the text block in a joint space of textual and video representations. In one configuration, for each video of the plurality of training videos, the device may propagate metadata or title of the video, along with a text block corresponding to the video, through the neural network to obtain the textual representation of the text block in the joint space.

At 708, the device may propagate each of the plurality of training videos through the neural network to obtain a visual representation of the training video in the joint space. In one configuration, to propagate each of the plurality of training videos, the device may extract a representation for each frame of a training video and sum up representations of all frames of the training video to obtain a representation of the video. In one configuration, the visual representation of each training video in the joint space may be obtained without using metadata or title of the training video.

At 710, the device may adjust parameters of the neural network to reduce, for each pair of associated text block and training video, the distance in the joint space between a textual representation of the associated text block and a visual representation of the associated training video. In one configuration, the parameters of the neural network may be adjusted based on a loss function. The loss function may be configured to reduce, for each pair of associated text block and training video, the distance in the joint space between the textual representation of the associated text block and the visual representation of the associated training video. In one configuration, the loss function may be further configured to increase the distance in the joint space between textual representations of two different events.

FIG. 7B is a flowchart 750 of a method of using a trained neural network for zero-exemplar event detection. The method may be performed by a computing device (e.g., the apparatus 802/802') that is configured for zero-exemplar event detection. The neural network may be trained using the method described above in FIG. 7A. In one configuration, the same device may perform the methods described in FIGS. 7A and 7B. In another configuration, two different devices may perform the methods described in FIGS. 7A and 7B.

At 712, the device may optionally receive a text query and a plurality of testing videos. In one configuration, the text query may be provided to the neural network unaltered by semantic query generation.

At 714, the device may propagate the text query through the neural network to obtain a textual representation of the text query in a joint space of textual and video representations.

At 716, the device may propagate each of the plurality of testing videos through the neural network to obtain a visual representation of the testing video in the joint space. In one configuration, to propagate each of the plurality of testing videos, the device may extract a representation for each frame of a testing video and sum up representations of all frames of the testing video to obtain a representation of the testing video. The representation is projected into the joint space such that the representation is located at a specific point in the joint space.

At 718, the device may rank the plurality of testing videos based on distances in the joint space between the textual representation of the text query and visual representations of the plurality of testing videos.

At 720, the device may optionally select a set of videos from the plurality of testing videos based on the ranking. In one configuration, the set of selected videos may be retrieved as the result of the text query. In one configuration, visual representations of the selected set of videos may be the closest (among the plurality of testing video) to the textual representation of the text query in the joint space.

Figure 8:
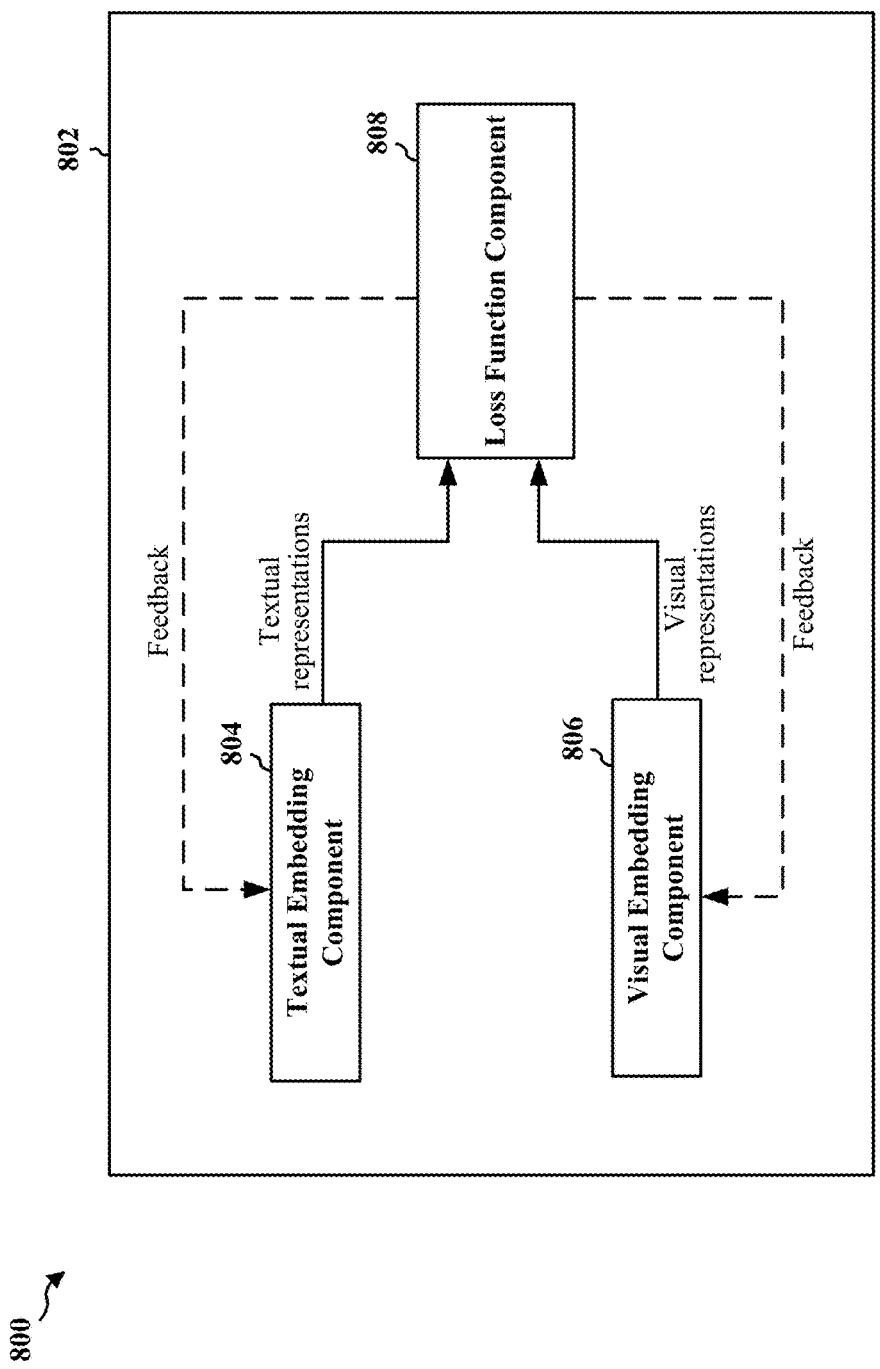
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus 802 may be a computing device.

The apparatus 802 may include a textual embedding component 804 that embeds or projects a text block or text query into a textual representation in a joint space of textual and visual representations. In one configuration, the textual embedding component 804 may perform operations described above with reference to 706 in FIG. 7A or 714 in FIG. 7B.

The apparatus 802 may include a visual embedding component 806 that that embeds or projects a video into a visual representation in the joint space. In one configuration, the visual embedding component 806 may perform operations described above with reference to 708 in FIG. 7A or 716 in FIG. 7B.

The apparatus 802 may include a loss function component 808 that is configured to minimize the distance between any two representations that are associated with the same event and distance any two representations that are associated with two different events. The loss function component 808 may receive textual representations from the textual embedding component 804 and visual representations from the visual embedding component 806, and provide feedbacks to the textual embedding component 804 and the visual embedding component 806. In one configuration, the textual embedding component 804 and the visual embedding component 806 may adjust parameters (e.g., weights) of a neural network based on the feedback from the loss function component 808. In one configuration, the loss function component 808 may perform operations described above with reference to 710 in FIG. 7A.

The apparatus may include additional components that perform each of the blocks of the algorithm in the aforementioned flowcharts of FIGS. 7A, 7B. As such, each block in the aforementioned flowchart of FIGS. 7A, 7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
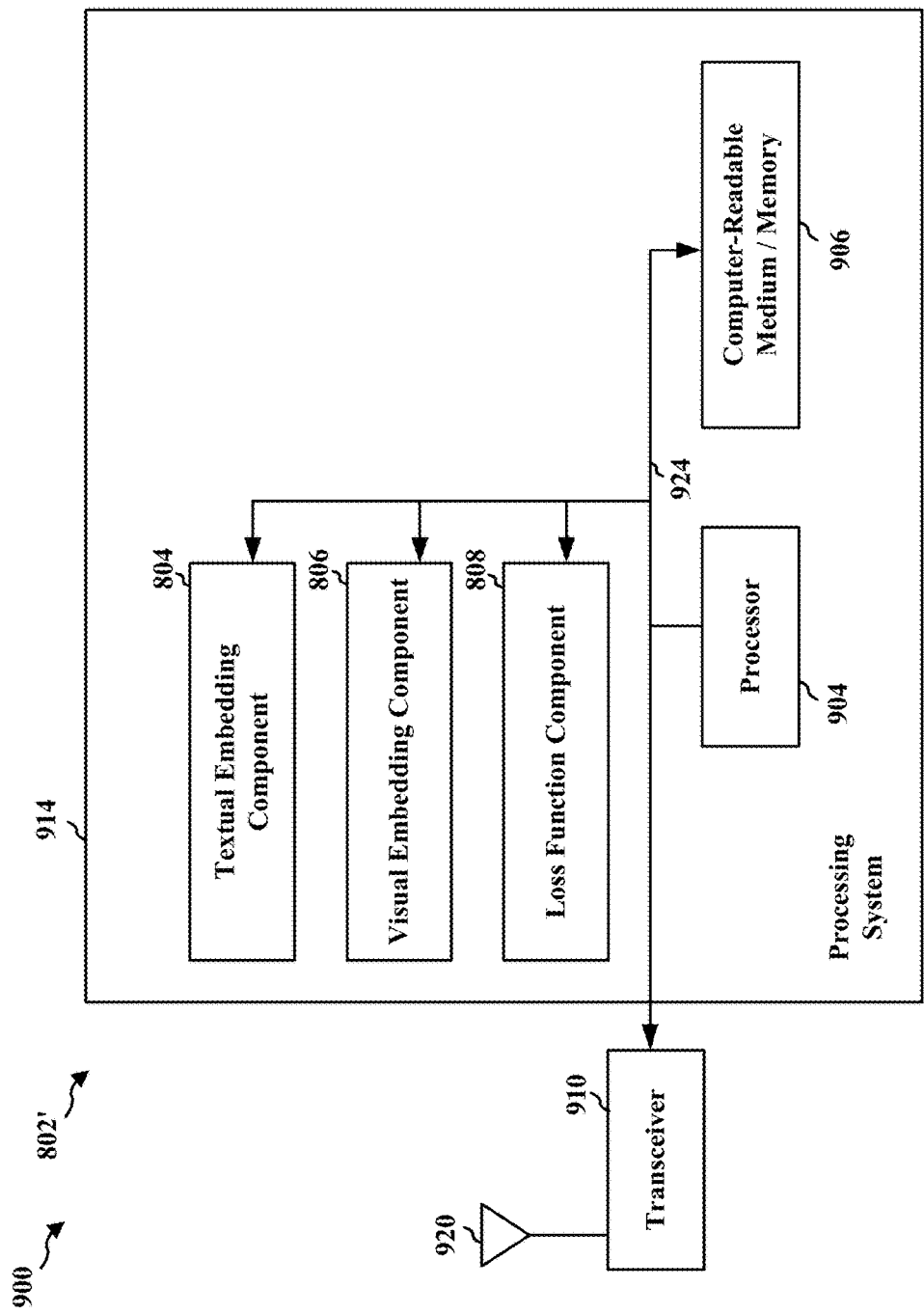
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 may be coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914. In addition, the transceiver 910 receives information from the processing system 914, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808. The components may be software components running in the processor 904, resident/stored in the computer readable medium/memory 906, one or more hardware components coupled to the processor 904, or some combination thereof.

In one configuration, the apparatus 802/802' may include means for receiving a plurality of text blocks, each of the plurality of text blocks describing one of a plurality of pre-defined events. In one configuration, the apparatus 802/802' may include means for receiving a plurality of training videos, each of which associated with one of the plurality of text blocks. In one configuration, the apparatus 802/802' may include means for propagating each of the plurality of text blocks through the neural network to obtain a textual representation of the text block in a joint space of textual and video representations. In one configuration, the apparatus 802/802' may include means for propagating each of the plurality of training videos through the neural network to obtain a visual representation of the video in the joint space. In one configuration, the means for propagating each of the plurality of training videos may be configured to extract a representation for each frame of the video and sum up representations of all frames of the video to obtain a representation of the video. In one configuration, the apparatus 802/802' may include means for adjusting parameters of the neural network to reduce, for each pair of associated text block and training video, the distance in the joint space between a textual representation of the associated text block and a visual representation of the associated training video.

In one configuration, the apparatus 802/802' may include means for receiving a text query. In one configuration, the apparatus 802/802' may include means for receiving a plurality of videos. In one configuration, the apparatus 802/802' may include means for propagating the text query through the neural network to obtain a textual representation of the text query in the joint space. In one configuration, the apparatus 802/802' may include means for propagating each of the plurality of videos through the neural network to obtain a visual representation of the video in the joint space. In one configuration, the apparatus 802/802' may include means for ranking the plurality of videos based on distances between the textual representation of the text query and visual representations of the plurality of videos in the joint space. In one configuration, the apparatus 802/802' may include means for selecting a set of videos from the plurality of videos based on the ranking. In one configuration, the apparatus 802/802' may include, for each video of the plurality of videos, means for propagating metadata or title of the video, along with a text block corresponding to the video, through the neural network to obtain the textual representation of the text block in the joint space.

The aforementioned means may be one or more of the aforementioned components of the apparatus 802 and/or the processing system 914 of the apparatus 802' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of event detection using a neural network, comprising:
    propagating each text block of a plurality of text blocks through the neural network to obtain a textual representation of the each text block in a joint space of textual and video representations, each of the plurality of text blocks describing one of a plurality of predefined events;
    propagating each training video of a plurality of training videos through the neural network to obtain a visual representation of the each training video in the joint space, each of the plurality of training videos associated with one of the plurality of text blocks;
    adjusting parameters of the neural network to reduce, for each pair of associated text block and associated training video, a distance in the joint space between a textual representation of the associated text block and a visual representation of the associated training video, wherein the parameters of the neural network are adjusted based on a loss function, wherein the loss function is further configured to increase a distance in the joint space between a first textual representation of a first event and a second textual representation of a second event, the first event different from the second event;
    propagating a text query through the neural network to obtain a textual representation of the text query in the joint space;
    propagating each video of a plurality of videos through the neural network to obtain a visual representation of the each video in the joint space; and
    ranking each video of the plurality of videos based on a distance in the joint space between the textual representation of the text query and the visual representation of the each video, wherein the ranking of each video is based on the increase of the distance of different events in the joint space by the loss function.

2. The method of claim 1, further comprising selecting a set of videos from the plurality of videos based on the ranking, wherein visual representations of the set of videos are closest to the textual representation of the text query in the joint space.

3. The method of claim 1, wherein the text query is provided to the neural network unaltered by semantic query generation.

4. The method of claim 1, wherein the propagating the each video of the plurality of videos comprises:
 extracting a representation for each frame of the each video; and
 summing up representations of all frames of the each video to obtain a representation of the each video.

5. The method of claim 1, wherein the visual representation of each video in the joint space is obtained without using metadata or title of the video.

6. An apparatus for event detection using a neural network, comprising:
 means for propagating each text block of a plurality of text blocks through the neural network to obtain a textual representation of the each text block in a joint space of textual and video representations, each of the plurality of text blocks describing one of a plurality of pre-defined events;
 means for propagating each training video of a plurality of training videos through the neural network to obtain a visual representation of the each training video in the joint space, each of the plurality of training videos associated with one of the plurality of text blocks;
 means for adjusting parameters of the neural network to reduce, for each pair of associated text block and associated training video, a distance in the joint space between a textual representation of the associated text block and a visual representation of the associated training video,
 wherein the parameters of the neural network are adjusted based on a loss function, wherein the loss function is further configured to increase a distance in the joint space between a first textual representation of a first event and a second textual representation of a second event, the first event different from the second event;
 means for propagating a text query through the neural network to obtain a textual representation of the text query in the joint space;
 means for propagating each video of a plurality of videos through the neural network to obtain a visual representation of the each video in the joint space; and
 means for ranking each video of the plurality of videos based on a distance in the joint space between the textual representation of the text query and the visual representation of the each video, wherein the rank of each video is based on the increase of the distance of different events in the joint space by the loss function.

7. The apparatus of claim 6, further comprising means for selecting a set of videos from the plurality of videos based on the ranking, wherein visual representations of the set of videos are closest to the textual representation of the text query in the joint space.

8. The apparatus of claim 6, wherein the text query is provided to the neural network unaltered by semantic query generation.

9. The apparatus of claim 6, wherein the means for propagating the each video of the plurality of videos is configured to:
 extract a representation for each frame of the each video; and
 sum up representations of all frames of the each video to obtain a representation of the each video.

10. An apparatus for event detection using a neural network, comprising:
 a memory; and
 at least one processor coupled to the memory and configured to:
  propagate each text block of a plurality of text blocks through the neural network to obtain a textual representation of the each text block in a joint space of textual and video representations, each of the plurality of text blocks describing one of a plurality of pre-defined events;
  propagate each training video of a plurality of training videos through the neural network to obtain a visual representation of the each training video in the joint space, each of the plurality of training videos associated with one of the plurality of text blocks;
  adjust parameters of the neural network to reduce, for each pair of associated text block and associated training video, a distance in the joint space between a textual representation of the associated text block and a visual representation of the associated training video,
  propagate a text query through the neural network to obtain a textual representation of the text query in the joint space;
  propagate each video of a plurality of videos through the neural network to obtain a visual representation of the each video in the joint space; and
  rank each video of the plurality of videos based on a distance in the joint space between the textual representation of the text query and the visual representation of the each video, wherein the rank of each video is based on the increase of the distance of different events in the joint space by the loss function;
 wherein the parameters of the neural network are adjusted based on a loss function, wherein the loss function is further configured to increase a distance in the joint space between a first textual representation of a first event and a second textual representation of a second event, the first event different from the second event.

11. The apparatus of claim 10, wherein the at least one processor is further configured to select a set of videos from the plurality of videos based on the ranking, wherein visual representations of the set of videos are closest to the textual representation of the text query in the joint space.

12. The apparatus of claim 10, wherein the text query is provided to the neural network unaltered by semantic query generation.

13. The apparatus of claim 10, wherein, to propagate the each video of the plurality of videos, the at least one processor is configured to:
 extract a representation for each frame of the each video; and
 sum up representations of all frames of the each video to obtain a representation of the each video.

14. The apparatus of claim 10, wherein the visual representation of each video in the joint space is obtained without using metadata or title of the video.

* * * * *